March 8, 1966      H. KESKKULA ETAL      3,239,582

BLEND OF POLYCARBONATE RESIN AND ALKENYLAROMATIC RESIN

Filed April 13, 1962

INVENTORS
Henno Keskkula
Arthur A. Pettis

BY
ATTORNEY 3,239,582
BLEND OF POLYCARBONATE RESIN AND
ALKENYLAROMATIC RESIN
Henno Keskkula, Midland, and Arthur A. Pettis, Saginaw, Mich., assignors to The Dow Chemical Company, Midland, Mich., a corporation of Delaware
Filed Apr. 13, 1962, Ser. No. 187,324
5 Claims. (Cl. 260—873)

This application is a continuation-in-part of our copending application, Serial No. 736,700, filed May 21, 1958, now abandoned.

The present invention relates to a new class of thermoplastic moldable resins and more particularly concerns a blend of two aromatic-base resinous materials wherein the desirable properties of the resin present in major proportion are retained and the undesirable properties thereof are materially improved and wherein the undesirable properties of the resin in minor proportions are not observable in the final product.

It is well known that most linear thermoplastic materials such as, for example, polystyrene (an alkenylaromatic resin) can be readily molded or extruded. This is theorized as being a result obtained because of the linearity of the structure and their flexibility at molding temperature. However, the polycarbonates even though linear in structure do not have a flexibility at customary molding temperatures and thus are very difficult to mold and extrude. The polycarbonates have excellent physical properties except for their high melt viscosity which contributes to the difficult moldability. That is the polycarbonates' desirable properties are high heat distortion temperatures, good modulus of elasticity, good toughness and good tensile strengths. The alkenyl-aromatic resins on the other hand are usually brittle and have low heat distortions.

It was surprising then to find that the desirable properties of the polycarbonate could be retained and the undesirable property of high melt viscosity could be improved by a blend comprising a mixture of from 95 to 80% by weight of a polycarbonate having the following backbone

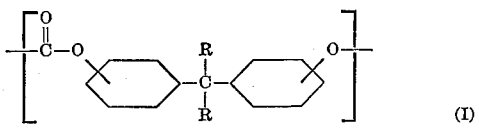

wherein each R represents a member independently selected from the group consisting of hydrogen and alkyl having from 1 to 3 carbon atoms and when R's may be joined together to form with the carbon atom of attachment a cyclohexyl ring, with from 5 to 20% by weight of an alkenylaromatic polymer or copolymer. It is to be understood that the alkenylaromatic polymer or copolymer comprises at least 50% of styrene or its α-methyl substituted or ar-chloro-substituted derivatives. Thus, one can employ polystyrene, polystyrene-acrylonitrile copolymers, polystyrene-acrylonitrile-α-methylstyrene copolymers, as well as the rubber-modified polystyrenes.

Figure 1:
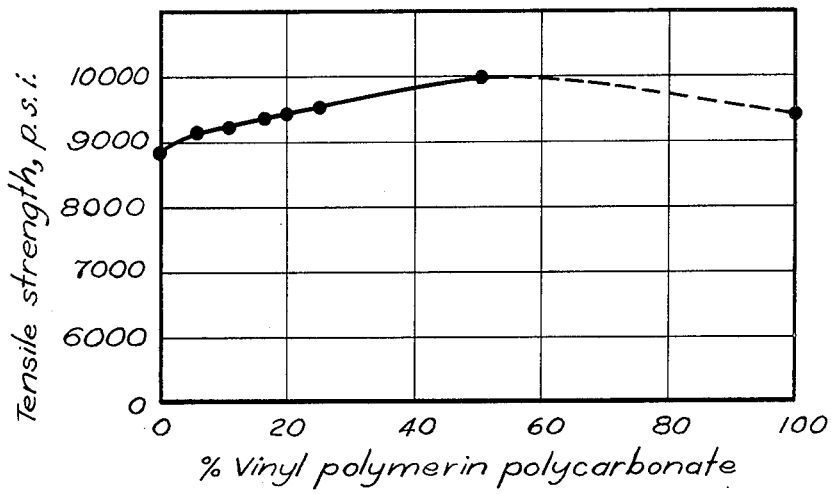
FIGURE 1 represents a graph of the tensile strength of a polycarbonate resin modified with various amounts of a 70% styrene–30% acrylonitrile copolymer. It is apparent from the drawing that the tensile strength of the polycarbonate is not materially affected by as much as 20% by weight of the modifier.
Figure 2:
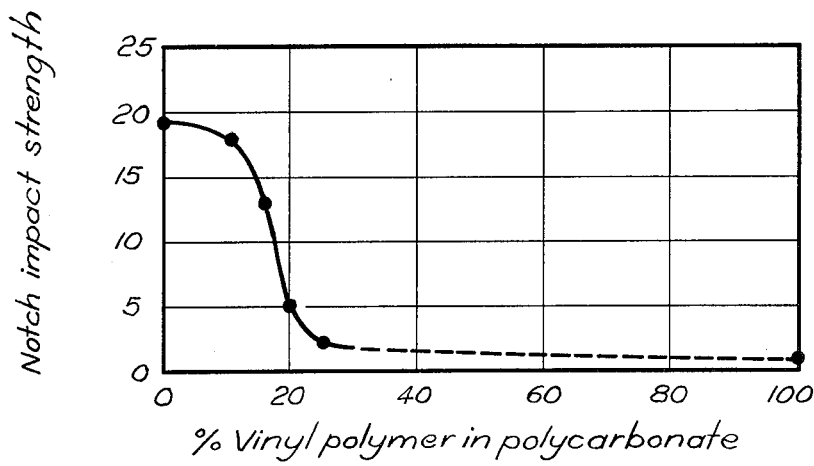
FIGURE 2 represents a graph of the notched impact strength vs. the percent modifier in a polycarbonate. The resin is the same as that shown in the composition for FIGURE 1.

For convenience, the above-mentioned polycarbonates (polyesters of carbonic acid and alkylidenediphenols) will hereinafter be referred to generically as "bisphenol polycarbonates" and have the general Formula I with a hydrogen attached to each bond. They include compounds prepared by reacting phosgene (carbonyl chloride) with alkylidenediphenols, as for example, bis(p-hydroxyphenyl)methane, 2,2-bis(m-hydroxyphenyl)butane, 1,1-bis(o-hydroxyphenyl)ethane, 2,2-bis(p-hydroxyphenyl)propane (i.e. isopropylidenebisphenol), 1,1-bis(p-hydroxyphenyl)-cyclohexane (cyclohexylidene bisphenol) and the like.

The term "alkenylaromatic resins" is employed herein to refer generically to solid thermoplastic polymers and copolymers composed for the most part, i.e. containing in chemically combined form a total of at least 50% by weight, of one or more monoalkenylaromatic compounds having the general formula:

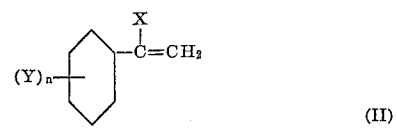

wherein X represents hydrogen or a lower alkyl radical such as a methyl or ethyl radical; Y represents a member of the group consisting of hydrogen, halogens having atomic numbers of from 17 to 35, inclusive, and lower alkyl radicals containing from 1 to 4 carbon atoms such as the methyl, ethyl, propyl, isopropyl, butyl, sec-butyl and tert-butyl radicals; and n represents an integer from 1 to 5. Illustrative of the alkenylaromatic compounds which are included with the above scope are, for example, styrene, α-methylstyrene, the mono-, di-, tri-, tetra- and penta-chlorostyrenes and α-methylstyrenes, and the nuclearly alkylated styrenes and α-alkylstyrenes such as ortho- and para-methylstyrenes, ortho- and para-ethyl-styrene, ortho- and para-methyl-α-methylstyrene and the like. Constituents which may be copolymerized with the alkenylaromatic compounds to make the alkenylaromatic resins are, for example, acrylonitrile, butadiene, and the like. The term "alkenylaromatic resin" is also meant to include rubber-modified polystyrenes available in commerce. Thus, for example, suitable alkenylaromatic resins include polystyrene, styreneacrylonitrile copolymers, styrene-butadiene copolymers, rubber-modified polystyrenes, styrene-acrylonitrile-α-alkylstyrene copolymers such as styrene-acrylonitrile-α-methylstyrene, and the like.

In accordance with the present invention a bisphenol polycarbonate is mechanically admixed in a heat-softened condition with an alkenylaromatic resin to produce a product having improved characteristics over those of either component. Good results have been achieved when the alkenylaromatic polymer is employed in from about 5 to about 20% by weight. It is to be understood that compatible dyes, pigments, fillers, plasticizers, stabilizers and other adjuvants may be incorporated into the product without departing from the present invention.

The following examples illustrate the present invention but are not to be construed as limiting.

EXAMPLES 1–22

A polycarbonate and an alkenylaromatic resin were mixed or blended in a coplastometer (Modern Plastics, vol. 32, No. 7, pages 129–134 and 226, March 1955) at 440° F. (227° C.+) under a nitrogen pressure of 1450 p.s.i.g. The blend was forced back and forth six times to obtain a uniform mixture as evidenced by uniform flow time. The melt viscosity was determined and a flash molding was made of the blend to determine the color and heat distortion of the blend. The following table records the results of tests conducted on various blends.

| Ex. No. | Alkenylaromatic resin | | Polycarbonate | | Viscosity | | Distortion of film immersed in— | |
|---|---|---|---|---|---|---|---|---|
| | Polymer | Percent by weight | Ester | Percent by weight | Poises | Temp., °C. | Water, 100° C. | Oil, 110° C. |
| 1 | Copolymer of 70% styrene-30% acrylonitrile. | 0 | Poly(4,4'-isopropylidene-bisphenol carbonate).[1] | 100 | 91,000 | 250 | No | No. |
| 2 | Same | 10 | Same [1] | 90 | 39,200 | 250 | No | No. |
| 3 | Same | 20 | Same [1] | 80 | 31,383 | 250 | No | No. |
| 4 | Same | 30 | Same [1] | 70 | 14,750 | 250 | No | No. |
| 5 | Same | 50 | Same [2] | 50 | 6,080 | 250 | No | No. |
| 6 | Same | 75 | Same [2] | 25 | 6,200 | 250 | No | No. |
| 7 | Same | 100 | | 0 | 15,000 | 227 | Yes | Yes. |
| 8 | | 0 | Same [2] | 100 | 50,000 | 227 | No | No. |
| 9 | Copolymer of styreneacrylonitrile-α-methylstyrene (40-30-30).[3] | 10 | Same [1] | 90 | 19,000 | 250 | No | No. |
| 10 | Same [3] | 20 | Same [1] | 80 | 5,700 | 250 | No | No. |
| 11 | Same [3] | 30 | Same [1] | 70 | 1,830 | 250 | No | No. |
| 12 | Same [3] | 100 | | 0 | | | Yes | Yes. |
| 13 | Polystyrene [4] | 10 | Same [1] | 90 | 20,400 | 250 | No | No. |
| 14 | Same [4] | 10 | Same [2] | 90 | 25,500 | 227 | No | No. |
| 15 | Same [4] | 25 | Same [2] | 75 | 9,660 | 227 | No | No. |
| 16 | Same [4] | 10 | Same [5] | 90 | 29,000 | 227 | No | No. |
| 17 | Same [4] | 25 | Same [5] | 75 | 9,110 | 227 | No | No. |
| 18 | Same [4] | 100 | | 0 | | | Yes | Yes. |
| 19 | A rubber-modified polystyrene.[6] | 50 | Same [5] | 50 | 7,880 | 227 | No | No. |
| 20 | Same [6] | 75 | Same [2] | 25 | 4,600 | 227 | No | No. |
| 21 | Same [6] | 100 | | | 2,950 | 227 | Yes | Yes. |
| 22 | | | Same [5] | 100 | 63,840 | 227 | No | No. |

Notes:
[1] A polycarbonate manufactured by General Electric Company, and sold under the Trademark "Lexan."
[2] A polycarbonate manufactured by General Electric Company, and sold under the Trademark "Lexan."
[3] A product which has a viscosity of 2.9 centipoises in a concentration of 10% in methyl ethyl ketone.
[4] A product which has a viscosity of 6 centipoises in a concentration of 10% in toluene.
[5] A polycarbonate manufactured by General Electric and being sold under the Trademark "Lexan."
[6] A product containing 93% polystyrene, 5% butadiene rubber and 2% lubricant.

EXAMPLE 23

In a representative operation a blend of the same composition as Example 2 was prepared by mixing the resins in a size "B" Banbury mixer and injection molding in a 1 oz. Watson-Stillman injection molding machine to form a test bar of standard ASTM specification. The bar was clearer, i.e. had less discoloration, than a polycarbonate test bar molded in the same machine. Further, the mold was completely filled when using the blend whereas the mold was only partially filled with the polycarbonate alone.

EXAMPLE 24

The following table illustrates some of the physical properties of various blends of "bisphenol A polycarbonate"—blended with 70% styrene–30% acrylonitrile copolymer.

Table—Physical properties

| Formulation, percent polycarbonate/percent styrene copolymer | Cross head speed, in./min. | Tensile, lb./in.² | Elongation, percent | Notched impact room temperature | Modulus of elasticity, lb./in.² (×10⁵) |
|---|---|---|---|---|---|
| 100/0 | 0.5 | 8,800 | 75+ | 19.5 | 2.62 |
| | 10 | 9,390 | 75+ | | 1.99 |
| 95/5 | 0.5 | 9,100 | 75+ | 18.06 | 2.92 |
| | 10 | 9,630 | 72.5+ | | 2.43 |
| 90/10 | 0.5 | 9,120 | 75+ | 18.90 | 3.02 |
| | 10 | 9,420 | 75+ | | 2.67 |
| 85/15 | 0.5 | 9,250 | 75+ | 12.83 | 3.02 |
| | 10 | 10,500 | 62.5+ | | 2.79 |
| 75/25 | 0.5 | 9,540 | 75+ | 2.05 | 3.25 |
| | 10 | 10,660 | 70.4+ | | 3.25 |
| 0/100 | .25 | 9,440 | 2.0 | 0.28 | | selected from the group consisting of polymers containing in chemically combined form a total of at least 50% by weight of monoalkenyl aromatic radicals derived from a compound having the formula

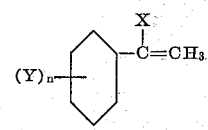

wherein X represents a member selected from the group consisting of hydrogen, methyl and ethyl, Y represents a member selected from the group consisting of hydrogen, halogen having an atomic number from 17 to 35 and lower alkyl radicals having from 1 to 4 carbon atoms, and $n$ represents an integer from 1 to 5, any remainder being acrylonitrile, and, (B) about 4 to 20 parts of the carbonic acid polyester of an alkylidenediphenol.

We claim:
1. A composition consisting essentially of a mixture of (A) one part by weight of an alkenylaromatic resin

2. A composition as set forth in claim 1 wherein said alkylidenediphenol is 4,4'-isopropylidenediphenol.

3. A composition as set forth in claim 2 wherein said alkenylaromatic resin is polystyrene.

4. A composition as set forth in claim 2 wherein said alkenylaromatic resin is a copolymer of styrene and acrylonitrile.

5. A composition of claim 2 wherein said alkenylaromatic resin is a copolymer of styrene, acrylonitrile and α-methylstyrene.

References Cited by the Examiner
UNITED STATES PATENTS

| | | | |
|---|---|---|---|
| 2,789,964 | 4/1957 | Reynolds et al. | 260—873 |
| 2,789,971 | 4/1957 | Reynolds | 260—873 |
| 2,843,567 | 7/1958 | Williams et al. | 260—77.5 |
| 3,021,305 | 2/1962 | Goldberg | 260—47 |
| 3,022,171 | 2/1962 | Ossenbrunner et al. | 260—47 |

MURRAY TILLMAN, *Primary Examiner.*
LEON J. BERCOVITZ, *Examiner.*